United States Patent
Beckwith

[19]

[11] Patent Number: 5,940,573
[45] Date of Patent: Aug. 17, 1999

[54] AUDIO EDITING SYSTEM

[75] Inventor: Timothy John Beckwith, Reading, United Kingdom

[73] Assignee: Quantel, Ltd., Newbury, Berkshire, United Kingdom

[21] Appl. No.: 08/735,238

[22] Filed: Oct. 22, 1996

[30] Foreign Application Priority Data

Oct. 23, 1995 [GB] United Kingdom .................... 9521688

[51] Int. Cl.⁶ ...................................... H06N 5/93
[52] U.S. Cl. ................................ 386/54; 386/52
[58] Field of Search ................. 386/56, 52, 61, 386/4, 55, 39, 104; 360/73, 96

[56] References Cited

U.S. PATENT DOCUMENTS

| | | |
|---|---|---|
| 4,667,221 | 5/1987 | Cawley et al. . |
| 4,688,106 | 8/1987 | Keller et al. . |
| 5,077,610 | 12/1991 | Searby et al. . |
| 5,107,252 | 4/1992 | Traynar et al. . |
| 5,142,616 | 8/1992 | Kellar et al. . |
| 5,175,622 | 12/1992 | Inoue et al. . |
| 5,175,625 | 12/1992 | Miles . |
| 5,212,544 | 5/1993 | Kellar et al. . |
| 5,237,648 | 8/1993 | Mills et al. . |
| 5,467,288 | 11/1995 | Fasciano et al. .......................... 364/514 |

FOREIGN PATENT DOCUMENTS

| | | |
|---|---|---|
| 0171829 | 2/1986 | European Pat. Off. . |
| 0396415 | 11/1990 | European Pat. Off. . |
| 0560624 | 9/1993 | European Pat. Off. . |
| 2156627 | 10/1985 | United Kingdom . |
| 2179819 | 3/1987 | United Kingdom . |
| 2248362 | 4/1992 | United Kingdom . |

OTHER PUBLICATIONS

Wescon 86/Conference Record, Los Angeles, CA, S. Rajpal, et al., "New Features on Static RAMS and Dual–Port RAMS Enhance System Performance", vol. 30, Nov. 1986, pp. 1–11.

*Primary Examiner*—Robert Chevalier
*Attorney, Agent, or Firm*—Cooper & Dunham LLP

[57] ABSTRACT

An audio editing system (50) comprises an audio store (51) for storing digital data representing audio clips. An editing processor (52) is operable in response to manipulation of a stylus and touch tablet (53) to edit the audio clip data. The editing processor (52) is arranged to generate edit data and store the same in an edit data store (54). A display processor (55) is arranged to generate from the edit data a set of data defining an image representing each of the audio clips and the manner in which they have been edited. The image is displayed on a monitor (56) and identifies audio clip portions selected to contribute to an audio sequence and all audio clip portions not selected contribute to the audio sequence.

14 Claims, 4 Drawing Sheets

AUDIO EDITING SYSTEM

BACKGROUND AND SUMMARY

The invention relates to an audio editing system and to a video editing system incorporating an audio editing system.

Video editing systems are available for creating an edited video sequence from a plurality of video clip portions. The video clip portions may be selected from different video clips, for example when it is desired to dissolve from one scene to another in the edited sequence, or they may be selected from one video clip, for example when it is desired to remove a central portion from the one video clip. An example of a known video editing system is described in European Patent Application No. 93301889.7 published as EP-A-560624 and U.S. application Ser. No. 08/030,823 the teachings of which are incorporated herein by reference.

Video is usually accompanied by audio in the form of plural audio tracks representing, say, stereo left and right channels, background music and a narrative. Thus, each video clip will have one or more associated audio clips. Video editing systems therefore commonly include an audio editing system to enable appropriate editing of the audio clips to suit the editing of the video clips.

The Quantel Henry editing system embodies the video editing system described in the aforementioned EP-A-560, 624 and includes an audio editing system which enables certain audio editing operations to be effected. Referring now to FIG. 1 of the accompanying drawings, the Quantel Henry editing system enables two video clips 1, 2 and associated audio clips 3, 4 to be selectively combined to produce a resultant video sequence 5 and associated resultant audio sequence 6. The two video clips 1, 2 and the two audio clips 3, 4 are joined at an edit point 7 either by a simple cut operation or by a more complicated wipe or dissolve operation. The video and audio clips 1 to 4 each comprise a portion 8 to 11 before or after the edit point 7 that may or may not contribute to the resultant video and audio sequences. The portions 8 to 11 are generally referred to as "tails". If the desired result is a wipe or dissolve across the edit point then the tails 8 to 11 will make a contribution to the resultant video and audio sequences. The data representing the video and audio tails should therefore be retained at least until such time as the user is satisfied with the resultant video and audio sequences.

There exists, however, a problem which can arise under two different circumstances. The first circumstance is represented by the situation depicted in FIGS. 2, 3 and 4 of the accompanying drawings. FIG. 2 shows a desired edit in which a first video/audio clip A is to be combined with a second video/audio clip B to produce a resultant video/audio sequence R. The first clip A has a short video out-tail 12 and a short audio out-tail 13 and the second clip has a short video in-tail 14 and a short audio in-tail 15. The in-tails 12, 13 and the out-tails 14, 15 are said to be short because the in-tails 12, 13 begin after the start 16 of the resultant video/audio sequences and the out-tails finish before the end 17 of the resultant video/audio sequences. FIG. 3 shows an alternative edit in which the second clip B' is combined with the first clip A' in such a manner that the clips have long in-tails 18, 19 and long out-tails 20, 21, because the in-tails 18, 19 begin before the start 16' of the resultant video/audio sequences R' and the out-tails 20, 21 finish after the end 17' of the resultant video/audio sequences. Hitherto, it has been assumed that the long audio tails are not required. One reason for assuming this is that it enables storage space to be made available for storing other audio. Another reason is that with multiple audio tracks for each video clip it soon becomes difficult to keep track of all the audio data including tails within the system.

An error that editors occasionally make during editing is to reverse the manner in which the two video/audio clips are combined so that instead of being combined as shown in FIG. 2 they are combined as shown in FIG. 3. Herein lies a problem. It is a simple matter to undo the effect of combining the video clips using the editing system described in the aforementioned EP-A-560,624, but because the long audio tails are discarded when clips A' and B' are combined it is not so straightforward to undo the effect of combining the audio clips.

As represented by FIG. 4 of the accompanying drawings, when the clips A' and B' are separated they produce two video/audio clips A" and B". However, the audio clip A" merely comprises a short portion 22 near the start and the audio clip B" merely comprises a short portion 23 at the finish because the audio at the portions 24 and 25 were discarded during the previous incorrect combining operation. Therefore, if the video/audio clips A" and B" are combined they will produce a resultant sequence R" in which the audio contains a large gap 26 between the short start portion 22 and the short finish portion 23. Hitherto, the only solution has been to replace the clip or clips from which audio data has been discarded with replacement data representing the entire unedited clip.

The second circumstance can arise in the situation represented by FIGS. 5 to 7 of the accompanying drawings. As shown in FIG. 5 of the accompanying drawings a resultant video/audio sequence R is produced from three initial video/audio clips A, B, C by editing together clips A and B at a first edit point 30 and editing together clips B and C at a second edit point 31. Thus, clip A will comprise an out-tail 32, clip B will comprise an in-tail 33 and an out-tail 34, and clip C will comprise an in-tail 35. It should be noted that there is no overlap of an in-tail from one clip with an out-tail from another clip. FIG. 6 of the drawings shows a similar situation where three video/audio clips A', B', C' are combined to produce an resultant video/audio sequence R' and thus each clip A', B', C' has an associated in-tail and/or out-tail 36 to 39. It will be noted that the out-tail 36 of clip A' and the in-tail 39 of clip C' overlap. Hitherto, it has been assumed that the portions of the two tails 36 and 39 that overlap are not required and the data for either or both of the overlapping portions has been discarded. As shown in FIG. 6 only the portion 40 of the audio in-tail 39 of clip C' has been deleted but equally the corresponding portion of the audio out-tail 36 could have been deleted as well as or instead of the portion 40.

Occasionally editors will inadvertently misposition clips so that there are overlapping tails such as shown in FIG. 6. For the purpose of the following explanation it should be assumed that the arrangement shown in FIG. 5 is the desired arrangement and that the arrangement shown in FIG. 6 has been reached unintentionally by the editor. It is a simply matter to undo the effect of combining the video clips B' and C' using the video editing system described in EP-A-560, 624 but the discarding of the portion 40 means that it is not so straightforward to undo the effect of combining audio clips B' and C'. As shown in FIG. 7, simply moving the clip C" to the correct position will produce a resultant sequence R'" in which there is a gap 41 in the audio sequence resulting from the deletion of the portion 40 during the previous, incorrect, combining of the clips. Hitherto, the only solution has been to replace the clip or clips from which audio data has been discarded with data representing an unedited and complete version of the clip from an off-line source.

The present invention aims to overcome the above discussed problems.

According to one aspect of the invention there is provided an audio editing system for selectively combining portions of plural audio clips to produce a resultant audio sequence, in which system a visual representation is displayable of the plural audio clips identifying audio clip portions selected to contribute to the audio sequence and all audio clip portions not selected to contribute to the audio sequence.

The displaying of a visual representation of all audio clip portions not selected to contribute to the audio sequence facilitates subsequent re-editing by enabling direct access to the audio portions not selected in the event that a change to the selected combination is required for example.

According to another aspect of the invention there is provided an audio editing system for creating an edited audio sequence from a plurality of audio clip portions, in which system the plurality of audio clip portions are represented by digital data stored in an audio store, and editing data is generated during editing identifying locations in the store at which data representing audio clip portions selected to contribute and all audio clip portions not selected to contribute to the edited audio sequence.

The generation of editing data representing all audio clip portions not selected to contribute to the edited audio sequence facilitates editing by enabling the data to be accessed directly from the audio store for example if a change to the edited audio sequence is required.

The audio editing system may be incorporated into a video editing system for selectively combining portions of plural video clips and associated plural audio clips to produce a resultant video sequence and associated audio sequence.

According to a further aspect of the invention there is provided a video editing system for combining plural initial video clips each having one or more audio clips associated therewith to produce a resultant video sequence having one or more associated resultant audio sequences, the system comprising: an audio store for storing data representing each of the audio clips; user operable input means for generating control signals in response to user manipulation thereof; an editing processor responsive to said control signals for generating edit data defining user desired editing operations to be applied to the audio clips; an edit data store for storing the edit data; and a display processor for generating from the edit data, data defining an image representing the audio clips, and wherein the editing processor is arranged to generate data identifying portions of the audio clips selected to contribute to the resultant audio sequence and identifying all other portions of the audio clips not selected to contribute to the resultant audio sequence, the generated data being stored in the edit data store; and the data generated by the display processor defines an image representing both the portions of the audio clips selected to contribute to the resultant audio sequence and all other portions of the audio clips not selected to contribute to the resultant audio sequence.

The above and further features of the invention together with advantages thereof will become clearer from consideration of the following detailed description of an exemplary embodiment of the invention given with reference to the accompanying drawings.

BRIEF DESCRIPTION OF THE DRAWINGS

In the drawings:

Referring now to FIG. 8 of the accompanying drawings there is shown a system 50 embodying the invention. The system 50 comprises an audio store 51 for storing digital data representing audio clips. The audio store 51 is connected to receive digital audio data from an audio source (not shown) such as a VTR or a magneto optical disc for example. The system 50 further comprises an editing processor 52 connected to the audio store 51 for the transfer of audio data therebetween. A stylus and touch tablet 53 or other suitable user operable input device is connected to input control signals to the editing processor 52 in response to manipulation of the stylus on the touch tablet by a user. In response to control signals from the stylus/touch tablet 53, the editing processor 52 generates edit data and stores the same in an edit data store 54. The edit data identifies the audio clip, the length of the clip, the position of an edit point in the clip and the length of any tails created as a result of the editing.

Figure 1:
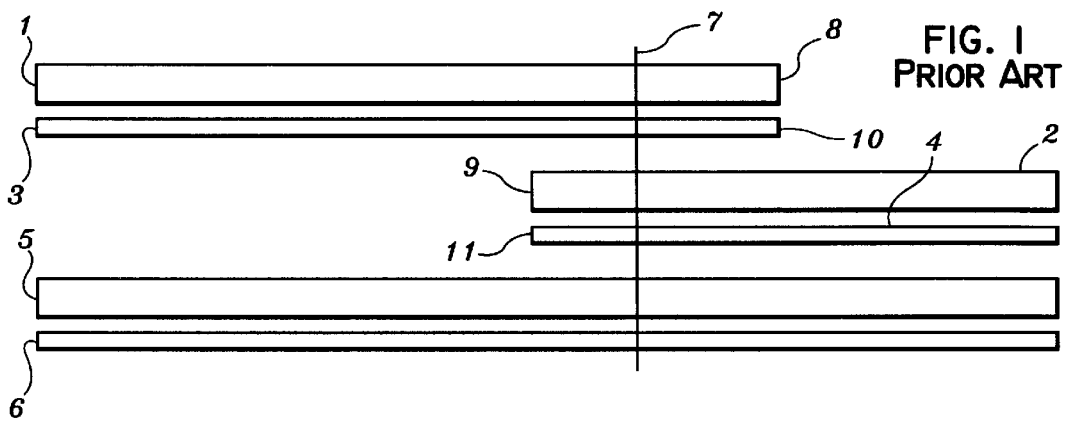
FIG. 1 is a schematic representation of the editing of video and audio clips.
Figure 2:
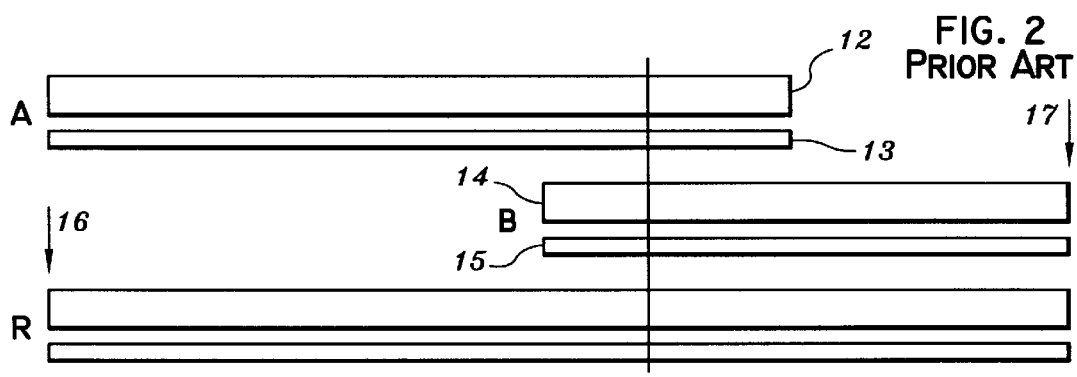
FIG. 2 shows a desired edit in which two video/audio clips are to be combined to produce a resultant video/audio sequence.
Figure 3:
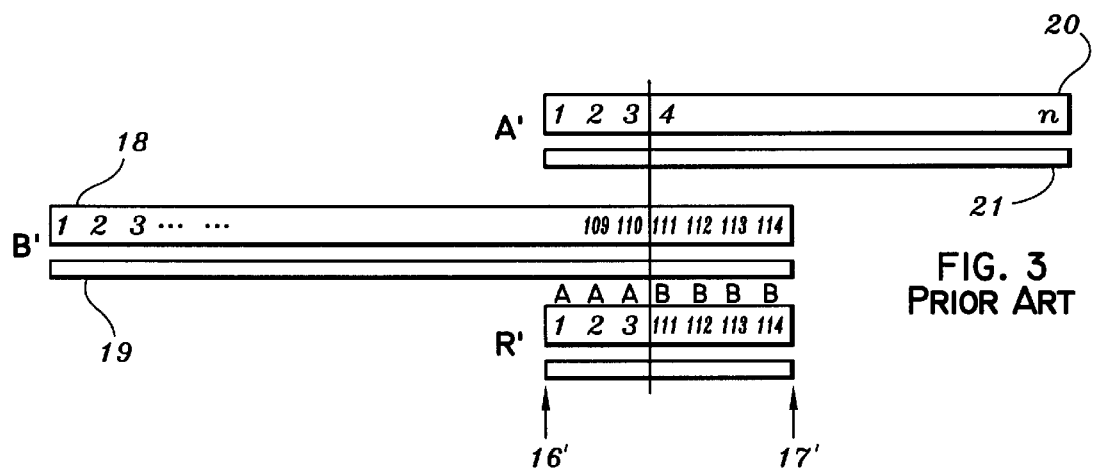
FIG. 3 shows an alternative edit.
Figure 4:
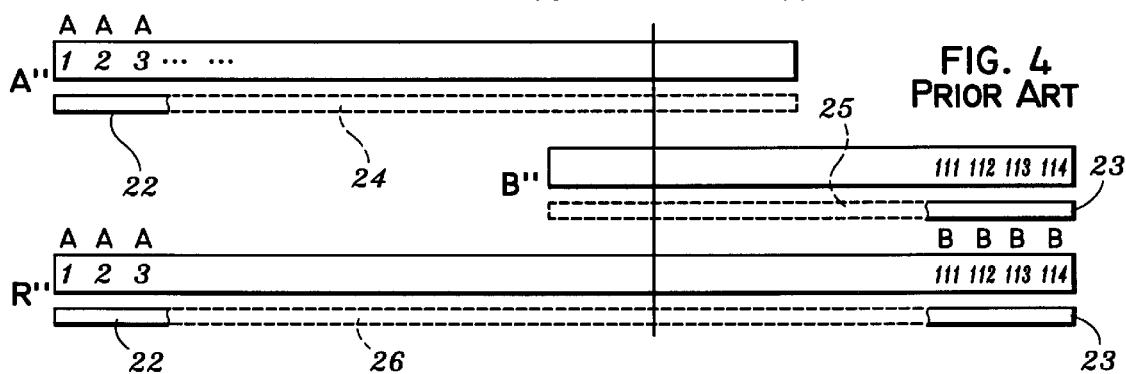
FIG. 4 illustrates a disadvantage of subsequent editing following the alternative edit.
Figure 5:
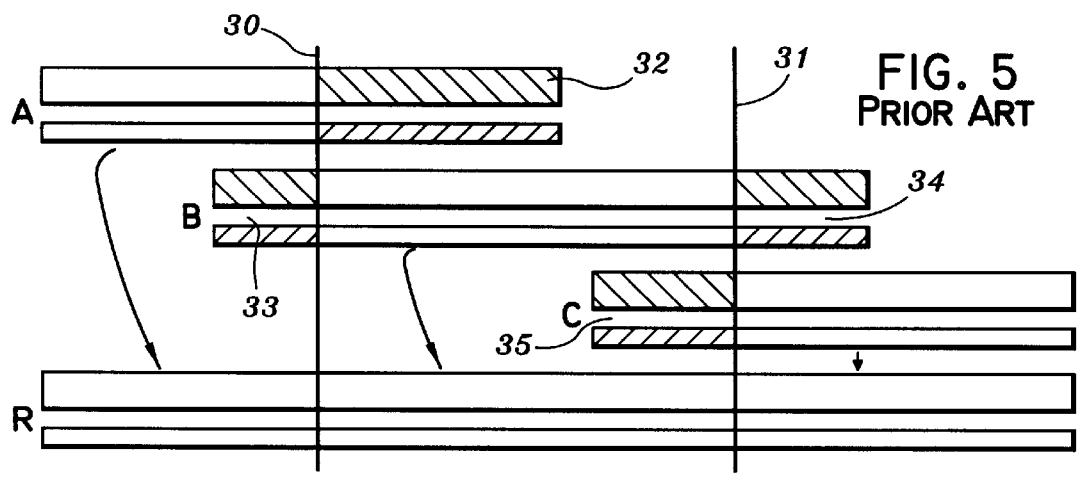
FIG. 5 represents the editing together of three video/audio clips to produce a resultant video/audio sequence.

A display processor 55 is connected to the editing processor 52 and the edit data store 54. The display processor is arranged to generate from the edit data a set of data defining an image representing each of the audio clips and the manner in which they have been edited. The image represented by the data from the display processor is displayed on a monitor 56 to enable the user of the system to see a visual representation of the effects of his editing. The editing processor 52 is also connected to an audio driver 57. The audio driver 57 enables the user to hear how the audio tracks have been edited. In a preview mode of operation digital audio data is read from the audio store 51 by the editing processor 52 depending on the edit data in the store 54 and is output to the audio driver 57 where it is converted into a suitable form to drive a loud speaker (not shown).

Figure 8:
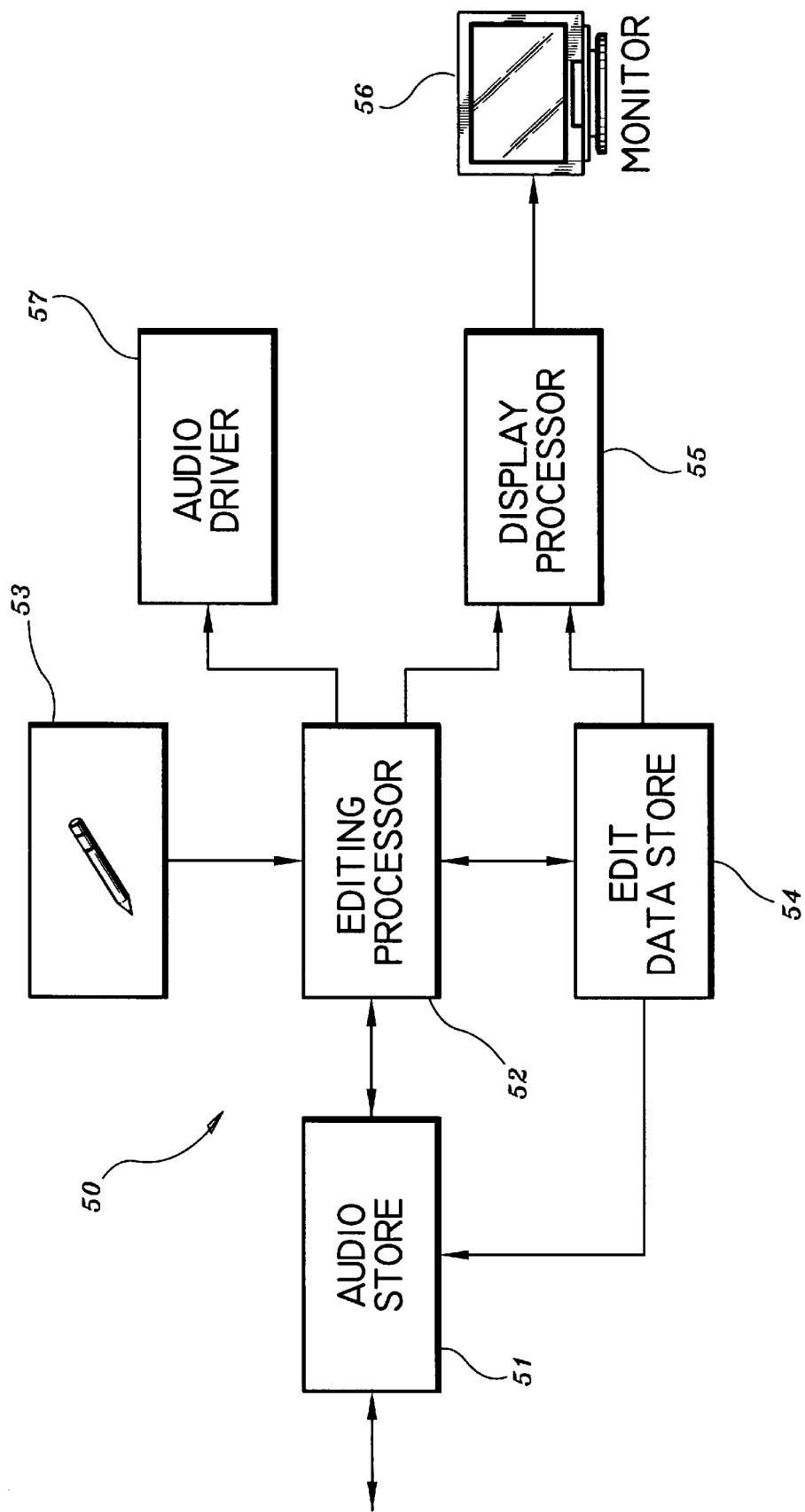
FIG. 8 is a schematic representation of a system embodying the invention.

It should be noted that the system 50 may be incorporated in a video editing system of the kind described in the aforementioned EP-A-560,624. In such a combined editing system, the editing of video and the editing of audio would normally be so linked together that the editing of a video clip would result in equivalent editing being applied to the audio clips associated with the video clip. Independent editing of the video and audio clips may, of course, also be effected. For the sake of clarity, aspects of the video editing system have been omitted from FIG. 8.

The edit data in the edit data store 54 defines each editing operation in terms of data identifying portions of the audio clips selected to contribute to the resultant audio sequence and identifying all other portions of the audio clips not selected to contribute to the resultant audio sequence. The identification of portions not selected to contribute to the resultant sequence provides a full definition of how the edit applies to each audio clip in its entirety. As a result, no portions of the audio clips are arbitrarily discarded or "lost" by the system.

Figure 9:
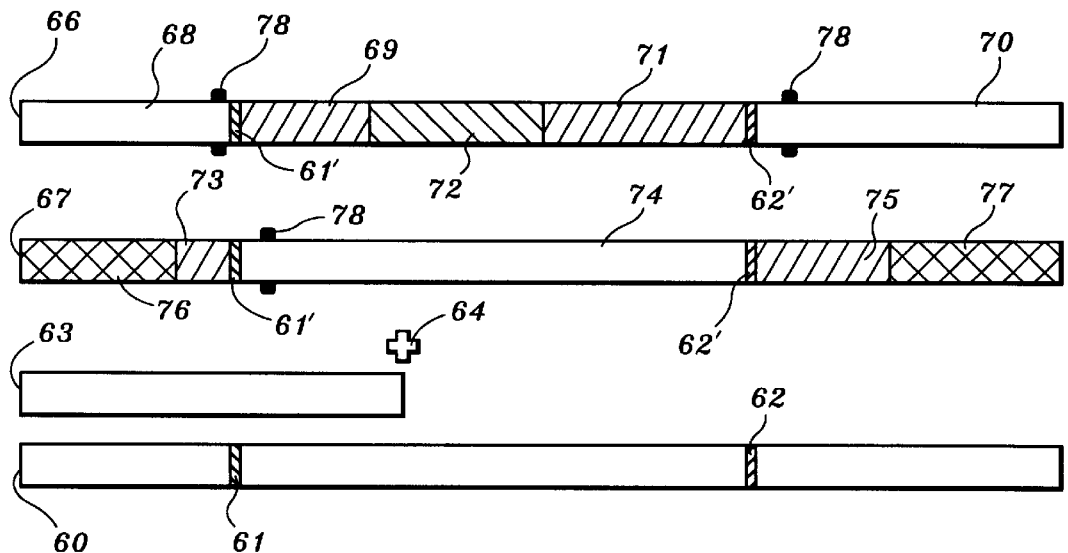
FIG. 9 is a schematic diagram of a first display of audio editing.
Figure 10:
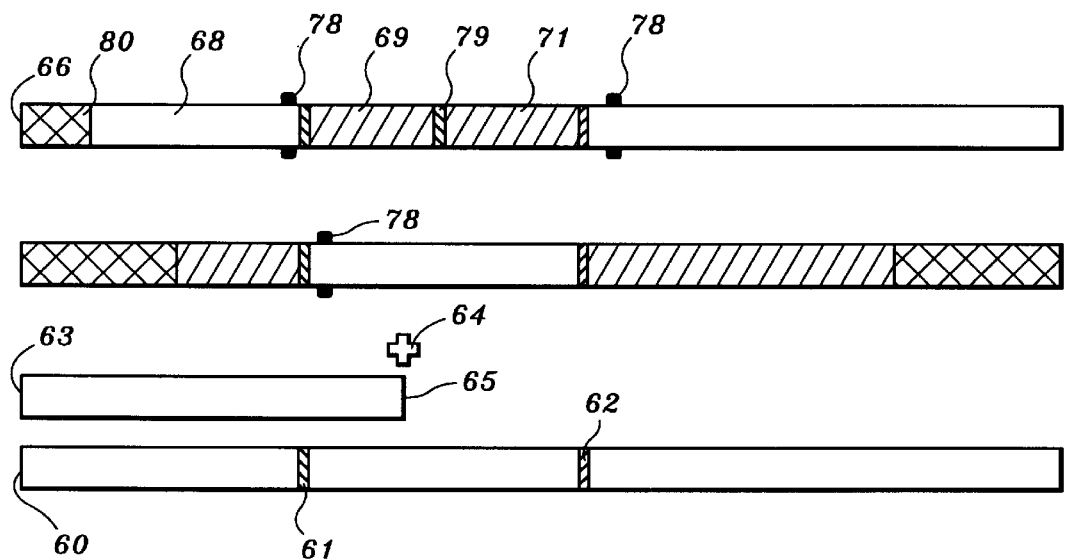
FIG. 10 is a schematic diagram of a second display of audio editing.

FIGS. 9 and 10 of the accompanying drawings show an exemplary image generated by the display processor 55 for display on the monitor 56 during an editing operation. Normally the image of FIGS. 9 and 10 would be displayed in a menu portion at the bottom (say the lower third) of the display screen on the monitor 56.

Referring first to FIG. 9, the image comprises a main time bar which represents the entire duration of the resultant video/audio sequence produced by the editing system. The main time bar 60 includes edit marks 61, 62 which indicate each of the edit points (in this example two) in the resultant video/audio sequence. Above the time bar 60 there is displayed a current position bar 63 which indicates (primarily for the purpose of video editing) the position of the video frame presently displayed elsewhere on the monitor. The current position can be varied by placing a cursor 64 at the end 65 of the current position bar 63 and dragging the bar across the screen. When "play" is selected from a menu (not shown) elsewhere on the monitor the resultant video/audio sequence will play back commencing from the position indicated by the current position bar 65.

Above the current position bar 63 there are normally displayed bars representing each of the video clips currently being edited. For the sake of clarity the video clip bars have been omitted from FIGS. 9 and 10. Therefore, as shown in FIGS. 9 and 10, above the current position bar 63 there are displayed two audio clip bars 66 and 67. It should be noted that in reality each video clip will be accompanied by, typically, an audio clip comprising four separate, independent audio tracks. For the sake of clarity, only two audio clip time bars have been shown.

The audio clip time bars 66 and 67 each include edit point markers 61', 62' corresponding to the edit point markers 61, 62 in the main time bar 60. The audio clip time bar 66 represents two consecutive audio clips. The first of these two audio clips comprises a portion 68 that contributes to the resultant audio sequence before the edit point 61 and an out-tail 69 after the edit point 61. The second of these two clips comprises a portion 70 that contributes to the resultant audio sequence after the edit point 62 and an in-tail 71 before the edit point 62. The out-tail 69 ends before the beginning of the in-tail 71 and the interval between the two tails is represented by an area 72 of the time bar. In FIG. 9 the different portions of the clips are represented by different cross-hatchings, but in practice the portions will be represented by different colours. The time bar 67 represents a single audio clip having an in-tail 73 before the edit point 61', a portion 74 that contributes to the resultant audio sequence between the edit points 61' and 62', and an out-tail 75. The total duration of the clip including the in-tail 73 and out-tail 75 is less than the total time represented by the main time bar 60. The time period before the in-tail 73 and the period of time after the out-tail 75 are represented by differently shaded areas 76, 77.

It is necessary to be able to synchronise the outputting of the audio signal with the display of a frame during the resultant video sequence. This is achieved by way of synchronisation markers 78 which may be placed anywhere within the contributing portion of each audio clip to tie that instant of audio to the displaying of a correspondingly selected video frame. Note that in the audio portion 68 the synchronising marker 78 is positioned just before the edit point 61.

Figure 6:
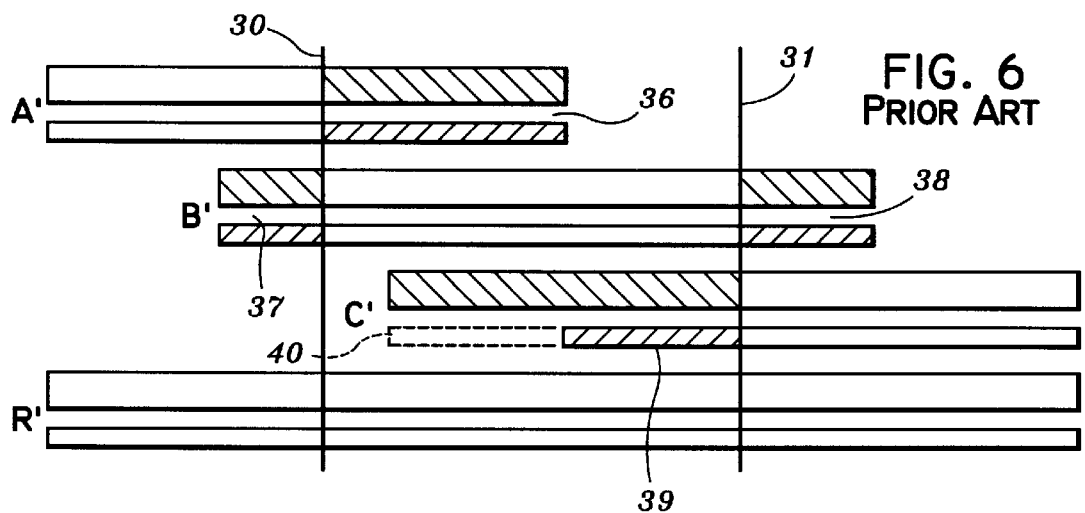
FIG. 6 shows an alternative edit with overlapping tails.
Figure 7:
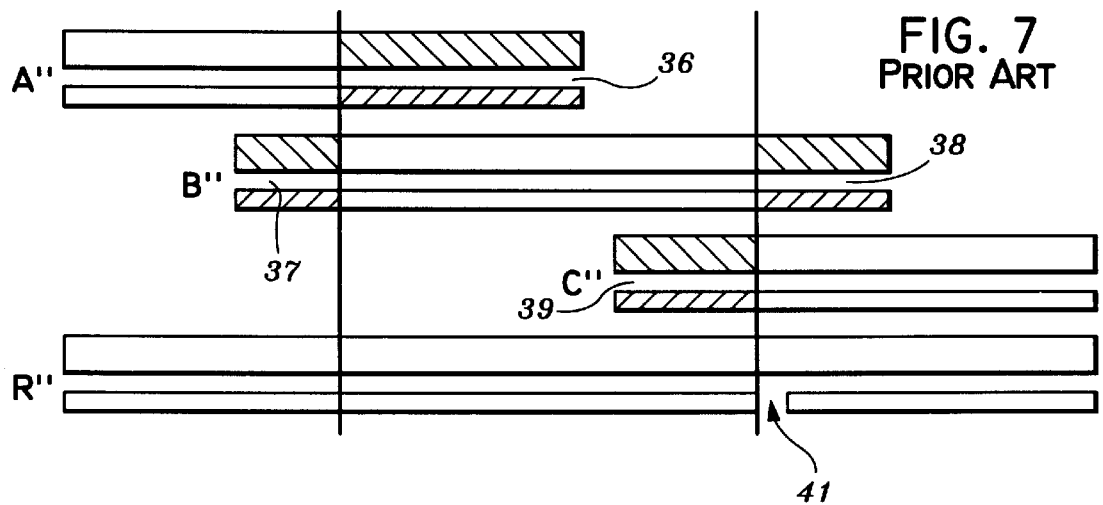
FIG. 7 shows a disadvantage of subsequent re-editing of the FIG. 6 arrangement.

The display shown in FIG. 10 is in many respects similar to that shown in FIG. 9. In FIG. 10 the edit points 61, 62 have been moved closer together and toward the middle of the main time bar 60. As a result, the tails 69, 71 in the audio clip bar 66 overlap each other (this is similar to the situation shown in FIG. 6). An overlap marker 79 indicates that the tails 69, 71 overlap and that the audio in the overlapping portions is available for further editing if so required. Alternative forms of indication may, of course, be employed if so desired. For example, the overlapping tails might be signified by a narrow horizontal bar positioned above the audio clip time bar. However, there are usually many audio clips and such a representation would quickly becomes cluttered and difficult to understand. It is believed that a simple overlap marker such as that indicated at 79 is the best way to convey overlapping tail information to the user.

It should be noted that in FIG. 10 the synchronising markers 78 have moved with the edit points 61, 62. Thus, synchronising between the audio and the video is maintained even though the edit points have been moved. An effect of this movement is to vary the position at which the first portion 68 begins. The first portion 68 is of fixed length and is shorter than the distance between the beginning of the resultant audio sequence 60 and the edit points 61. Consequently, there is a period when no audio is output and this period is represented by the cross-hatched area 80 in the time bar 66.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention and equivalents thereof.

I claim:

1. An audio editing system for selectively combining portions of plural audio clips to produce a resultant audio sequence, the system comprising:

a source of audio signals representing plural initial audio clips;

a user manipulable device for generating command signals in response to user manipulation thereof;

a display device; and a processor connected to receive said command signals from said user manipulable device and audio signals from said source representing plural received audio clips, the processor being responsive to said command signals to select audio signal portions corresponding to portions of the received audio clips for contribution to a resultant audio sequence, and generating data defining a pictorial representation for display on the display device, which pictorial representation identifies portions of the received audio clips selected to contribute to the resultant audio sequence and portions of the received audio clips not selected to contribute to the resultant audio sequence, whereby all portions of the received audio clips are shown in the pictorial representation.

2. An audio editing system as claimed in claim 1, wherein the graphical representation comprises one or more bars each representing one or more of the received audio clips.

3. An audio editing system as claimed in claim 2, wherein at least one bar comprises for each received audio clip a first portion representing an in-tail or an out-tail corresponding to a portion of the clip not selected to contribute to the audio sequence, and a second portion representing a portion of the clip selected to contribute to the audio sequence.

4. An audio editing system as claimed in claim 3, wherein at least one bar comprises for each audio clip a third portion representing an in-tail or an out-tail.

5. An audio editing system as claimed in claim 3, wherein at least one bar comprises a marker representing an overlap between an in-tail and an out-tail of respective adjacent audio clips.

6. An audio editing system as claimed in claim 4, wherein at least one bar comprises for each audio clip an edit mark at each interface between the second portion and the first or third portion.

7. An audio editing system as claimed in claim 2, wherein at least one bar comprises one or more video synchronization markers indicating a point of synchronization between the audio clip and a corresponding video clip.

8. An audio editing system as claimed in claim 2, wherein the pictorial representation further comprises a main time bar representing the duration of an audio sequence.

9. An audio editing system as claimed in claim 2, wherein the pictorial representation further comprises a current time bar representing a current point of play of an audio sequence.

10. An audio editing system as claimed in claim 9, wherein the length of the current time bar is adjustable by way of a cursor.

11. An audio editing system for creating an edited audio sequence from a plurality of audio clips, the system comprising:

an audio store for storing digital data representing a plurality of audio clips;

a user manipulable device for generating control data in response to user manipulation thereof;

an editing processor for receiving said control data from said user manipulable device and in response thereto generating editing data identifying locations in the store at which are stored portions of one or more of the plural audio clips selected to contribute to the edited audio sequence and identifying locations in the store at which are stored all other portions of the one or more audio clips not selected to contribute to the edited audio sequence;

an edit data store connected to the editing processor for storing the editing data generated by the editing processor;

a display processor connected to the edit data store for generating, from the editing data, display data defining a pictorial representation of the portions of one or more of the plural audio clips selected to contribute to the edited audio sequence and all the other portions of the one or more plural audio clips not selected to contribute to the edited audio sequence, whereby all portions of the one or more audio clips are shown in the pictorial representation.

12. A video editing system, including an audio editing system as claimed in claim 11, for selectively combining portions of plural video clips and associated plural audio clips to produce a resultant video sequence and associated audio sequence.

13. A video editing system, including an audio editing system as claimed in claim 11, for selectively combining portions of plural video clips and associated plural audio clips to produce a resultant video sequence and associated audio sequence.

14. A video editing system for combing plural initial video clips each having one or more audio clips associated therewith to produce a resultant video sequence having one or more associated resultant audio sequences, the system comprising:

an audio store for storing data representing each of the audio clips;

user operable input means for generating control signals in response to user manipulation thereof;

an editing processor responsive to said control signals for generating edit data defining user desired editing operations to be applied to the audio clips;

an edit data store for storing the edit data; and a display processor for generating from the edit data, data defining an image representing the audio clips, and wherein the editing processor is arranged to generate data identifying portions of the audio clips selected to contribute to the resultant audio sequence and identifying all other portions of the audio clips not selected to contribute to the resultant audio sequence, the generated data being stored in the edit data store; and the data generated by the display processor defines a pictorial representation of the portions of the audio clips selected to contribute to the resultant audio sequence and all other portions of the audio clips not selected to contribute to the resultant audio sequence, whereby all portions of the contributing one or more audio clips are shown in the pictorial representation.

* * * * *